United States Patent
McVay

(10) Patent No.: US 6,794,041 B2
(45) Date of Patent: Sep. 21, 2004

(54) ADDITIVES FOR LOW VOC AQUEOUS COATINGS

(75) Inventor: Robert L. McVay, Cincinnati, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 27 days.

(21) Appl. No.: 10/288,394

(22) Filed: Nov. 5, 2002

(65) Prior Publication Data

US 2004/0087686 A1 May 6, 2004

(51) Int. Cl.$^7$ ................................. B32B 15/08
(52) U.S. Cl. ............... 428/418; 106/14.42; 523/402; 523/406; 523/410; 523/414; 523/426
(58) Field of Search ............... 428/418; 523/402, 523/406, 410, 414, 426; 106/14.42

(56) References Cited

U.S. PATENT DOCUMENTS

| | | |
|---|---|---|
| 3,236,622 A | 2/1966 | Hartley et al. ............... 71/2.5 |
| 3,453,124 A | 7/1969 | Wurstner ..................... 106/14 |
| 4,212,781 A | 7/1980 | Evans et al. ......... 260/29.4 UA |
| 4,444,803 A | 4/1984 | Winters et al. ............... 427/27 |
| 4,741,780 A | 5/1988 | Atkinson ..................... 106/300 |
| 5,264,469 A | 11/1993 | Mysliwczyk et al. ....... 523/412 |
| 5,939,491 A | 8/1999 | Wilt et al. ................... 525/100 |
| 5,976,700 A | 11/1999 | Chutko et al. ............... 428/418 |
| 6,126,757 A | 10/2000 | Kinnaird ...................... 134/37 |
| 6,359,062 B1 | 3/2002 | Mallen ........................ 525/58 |

FOREIGN PATENT DOCUMENTS

| | | | |
|---|---|---|---|
| JP | 07016982 | * | 1/1995 |
| WO | WO97/12856 | | 4/1997 |
| WO | WO99/35215 | | 7/1999 |

* cited by examiner

Primary Examiner—Philip Tucker
Assistant Examiner—D. Aylward
(74) Attorney, Agent, or Firm—Diane R. Meyers

(57) ABSTRACT

Low VOC aqueous coatings having excellent wetting ability are disclosed. The compositions comprise a film-forming resin in conjunction with an additive comprising a carboxylic acid, an amine, and an alcohol. Methods for making and using these compositions are also disclosed, as are the additives themselves.

33 Claims, No Drawings

ADDITIVES FOR LOW VOC AQUEOUS COATINGS

FIELD OF THE INVENTION

The present invention relates to additives for use in low VOC aqueous coatings. More specifically, the additives comprise a carboxylic acid, an amine and an alcohol; these additives reduce the surface tension when used in water-based systems.

BACKGROUND OF THE INVENTION

Coatings are typically applied to the interior of metal food and beverage containers to prevent the contents from contacting the metal surface of the container. Contact with certain foods, particularly acidic products, can cause the metal container to corrode. This corrosion results in contamination and deterioration in the appearance and taste of the food or beverage product.

The internal protective coating applied to metal cans is typically one that has low extractibles to avoid contamination of the contents. The coating should also be substantially defect-free, and should possess high resistance to a wide variety of foods and beverages. Good adhesion to metal surfaces is also desired, as is good wetting, to ensure complete coverage to the metal and to protect the metal during baking and forming operations. The high temperatures needed to achieve rapid curing speeds, however, often result in blistering of the coating. Blistering typically occurs as cure temperature passes through the boiling point of water and can result in incomplete or weakened coverage of the can interior.

In addition, after can fabrication the aqueous coating must withstand the relatively stringent temperature and pressure requirements to which cans are subjected during food processing and that will provide the necessary level of corrosion resistance to the cans once filled.

SUMMARY OF THE INVENTION

The present invention relates to an additive for low VOC aqueous coatings comprising a carboxylic acid and an amine, in conjunction with an alcohol. The additive can be incorporated into a liquid, aqueous coating, including one that is pigmented. These coatings and methods of making these coatings are also within the scope of the present invention.

The additives of the present invention serve to reduce the surface tension of the aqueous coatings into which they are placed. This results in improved "wetting" of the coating on the metal surface. "Wetting" is a term used in the art to refer to the ability of a coating, particularly a waterborne coating, to cover a substrate with a continuous film, substantially free of defects. The use of compositions comprising the present additives results in a very complete coverage of the metal surface of the can, particularly over washcoat that has splashed inside the cans and at the bead area of the cans, which have historically been spots where adequate coating coverage can be hard to achieve. Better coating coverage correlates with better corrosion resistance. Significantly, the present additives enhance the performance of the coating without having any negative impact on the coating. It is difficult to find additives that do not negatively affect performance of the coating because the requirements for the coating application are so stringent; a very rapid, high temperature cure is employed in coating the cans and the cans are subjected to very high temperatures and pressures after filling. Cans coated with coatings containing the present additives also give excellent enamel rater performance, which confirms that the cans are substantially coated. An added advantage of the present compositions is that they are low in volatile organic content (VOC). Their use is therefore environmentally beneficial.

DETAILED DESCRIPTION OF THE INVENTION

The present invention is directed to an additive comprising a carboxylic acid, an amine, and an alcohol.

The carboxylic acid can have anywhere from about 2 to about 18 carbon atoms. It will be appreciated that carboxylic acids having from 2 to 7 carbon atoms are generally malodorous and their use in certain applications may therefore be undesirable. Carboxylic acids having from 8 to 18 carbons are therefore typically more suitable, particularly for application to food cans. The carboxylic acid can be derived from or contained in an animal or vegetable fat or oil, i.e. a fatty acid. Examples of suitable acids include, but are not limited to, oleic, caproic, enthanic, caprylic, capric, isodecyl, pelargonic, lauric, myristic, palmitic, linoleic, linolenic, stearic, isostearic, behenic, arachidic, arachidonic, erucic, azelaic, coconut, soya, tall oil, tallow, lard, neatsfoot, apricot, wheat germ, corn oil, cotton seed oil, ricinic, ricinoleic, rapeseed, palm kernel fatty acids, rosin acids, dimer acids, trimer acids, ozone acids, diacids, triacids, and combinations of these, as well as other acids from natural or synthetic sources. Particularly suitable are oleic acid and caprylic acid and mixtures thereof. In one embodiment, the carboxylic acid is combined with a solvent, such as pentanol and/or butanol. Carboxylic acids are widely commercially available.

The carboxylic acid is used with an amine according to the present invention, such as an alkylamine or alkanolamine. Examples of suitable amines include monoethanolamine, diethanolamine, triethanolamine, methylamine, dimethylamine, trimethylamine, ethylamine, diethylamine, triethylamine, diethylethanolamine, propylamine, isopropylamine, dipropylamine, diisopropylamine, tripropylamine, triisopropylamine, or some other alkyl- or alkanolamine having from one to about 12 carbons, or ammonia, or combinations of these. Particularly suitable is dimethylethanolamine ("DMEA"); DMEA provides good stability and good blister resistance.

An alcohol is also used according to the present invention. Any alcohol compatible with the carboxylic acid can be used. The alcohol can be branched or unbranched. In one embodiment, the alcohol has at least four carbons, and in another embodiment the alcohol has from 5 to 7 carbons. If the number of carbons is greater than about 8, resistance to blistering can be compromised. Thus, one skilled in the art can select the appropriate alcohol based upon the needs of the user.

Generally, the molar ratio of carboxylic acid to amine to alcohol will be about 1.5–3.5:11–14.5:43–92, such as 1.8–3.1:12–13.5:45–88. It will be appreciated that in some embodiments of the present invention, some amine may be introduced through an epoxy acrylic resin, and some alcohol may be introduced through a phenolic crosslinker.

In one embodiment, the composition specifically excludes fatty acid amides.

The present additives find particular application in coatings for metal food cans. The term "food cans" is used herein to refer to cans, containers or any type of metal receptacle for holding any type of food or beverage. Typical metals include tin plated steel, tin-free steel, and black plated steel, although the invention is not limited to use with these metals.

The present invention is further directed to an aqueous coating composition comprising a film-forming resin, a carboxylic acid, an amine, and an alcohol. Any film-forming resin suitable for use with food cans can be used according to the present invention. Examples of polymers useful in forming the resin include hydroxyl or carboxylic acid-containing acrylic copolymers, hydroxyl or carboxylic acid-containing polyester polymers, isocyanate or hydroxyl containing polyurethane polymers, and amine or isocyanate containing polyureas. These polymers are further described in U.S. Pat. No. 5,939,491, column 7, line 7 to column 8, line 2; this patent, as well as the patents referenced therein, are incorporated by reference herein. A particularly suitable film-forming resin is an epoxy acrylic resin, such as that described in U.S. Pat. No. 4,212,781, incorporated by reference herein. Other epoxy acrylics can also be used. Curing agents for these resins are also described in the '491 patent at column 6, lines 6 to 62; particularly suitable crosslinkers, especially for epoxy acrylic resins, include melamine and phenolic crosslinkers. "Phenolic" will be understood as referring to polymers made from one or more phenolic monomers, such as phenol, bisphenol A, t-butyl-phenol and the like reacted with formaldehyde. Combinations of curing agents can be used.

It will be appreciated that the present coatings are liquid coatings and more specifically are water-borne or aqueous coatings. Aqueous coatings are preferred over solvent-based coatings for environmental reasons. It will be understood, however, that the term "aqueous" as used herein means that the coatings are predominantly water; small amounts, such as less than 20 weight percent (based on the total weight of the volatiles) of conventional solvents, such as alcohols, can be included and still be within the scope of the present invention. Indeed, the inclusion of a small amount of alcohol is clearly within the present invention.

Significantly, the present compositions can also comprise a pigment. Any suitable pigment can be used including, $TiO_2$, ZnO and MgO. Pigments are added for color and also for hiding and stain resistance in coatings for cans that will contain high sulphide foods, such as meats.

The compositions of the present invention can also contain any other conventional additives such as colorants, waxes, lubricants, defoamers, wetting agents, plasticizers, fortifiers and catalysts. Any mineral or sulfonic acid catalyst can be used as a catalyst. Particularly suitably for food can applications are phosphoric acid and dodecyl benzene sulfonic acid.

The film-forming resin is generally present in the aqueous coating composition in an amount greater than about 11 weight percent, such as greater than about 12 weight percent, and less than 16 weight percent, with weight percent being based on the total weight of the coating. When a curing agent is used, it is generally present in an amount of up to 50 weight percent; this weight percent is based on total resin solids. The water or water/solvent mixture can be present in amounts ranging from 60 to 77 weight percent, such as 62 to 74 weight percent with weight percent being based on total weight of the coating. Carboxylic acid will be present in the composition in an effective amount. "Effective amount", when used in reference to carboxylic acid(s), refers to that amount of carboxylic acid which, when added to a coating, will improve the wetting ability of the coating. Wetting ability can be determined by means known in the art, such as the enamel rater test discussed herein. It will be appreciated that various coatings known in the art may contain trace amounts of carboxylic acids (i.e. <0.1 weight percent) due to inadvertent addition with various additives. Such amounts do not serve to improve wetting of the composition, however, and are therefore not "effective amounts" as used herein. Generally, the weight percent of carboxylic acid will be from 1.0 to 3.5, such as 1.5 to 2.0, with weight percent also being based on total resin solids, although even lower weight percentages can be used in certain formulations. The weight percent of amine generally ranges from 17 to 23, such as 19 to 21, with weight percent being based on the total organic solvent. The weight percent of alcohol can range from 50 to 62, such as 52 to 58, with weight percent also being based on the total weight of organic solvent. Pigments and other additives can comprise from 11 to 15 weight percent, such as 12 and 14 weight percent of the composition, with weight percent being based on total coating weight. Generally, the compositions are 24 to 34 percent solids and 76 to 66 percent volatiles. As used herein and as understood in the art, the term "volatiles" includes water.

A particularly suitable embodiment is a composition in which caprylic acid, alone or in conjunction with oleic acid, is used with an epoxy acrylic resin and a phenolic crosslinker. When both oleic and caprylic acids are used, the molar ratio of oleic to caprylic acids generally ranges from 1.0–2.5:1.0–7.5. It has been surprisingly discovered that use of caprylic acid allows for a significant increase in the solids content of the coating formulation. The amount of acid used in the formulation is as described above. For example, a solids content of 22 weight percent solids can be increased to 24, 25, 26 or even higher weight percent solids through the use of caprylic acid. Such a high solids product (i.e. greater than 22 weight percent solids) can be applied to a can at a weight of about 250 mg without blistering. This result is significant. Epoxy acrylic coatings having a solids content of about 22 weight percent are typically only applied at a weight of about 210 to 220 mg to a can, and blistering still occurs. Here, it has been surprisingly discovered that using the present composition at an increased amount will actually reduce if not eliminate blistering. Accordingly, the present invention is further directed to a food can coating having 24 weight percent solids, or greater, comprising caprylic acid. A food can coated and baked with 250 mg of this composition without substantial blistering is also within the present invention.

The carboxylic acid, amine and alcohol can be incorporated into the aqueous coating at any appropriate point during formation of the coating. In a particularly suitable embodiment, the carboxylic acid and amine are added separately during pigment dispersion. The amine is added first, optionally followed by a defoamer, and then the carboxylic acid(s). The amine and carboxylic acid(s) are not premixed, so any amine salts of the carboxylic acid(s) that may form are unintentional. Adding the carboxylic acid(s) and amine to the pigment dispersion provides good pigment wetting and dispersion of the pigment throughout the coating. If a different means is used to wet and disperse the pigment, the present additives can be included in the composition as a post-additive. In either case, the coating will have excellent wetting when applied to a metal substrate. An added advantage to the first method is that the present additives help in the formulation of the coating by aiding in pigment dispersion. Absent the carboxylic acid of the present invention, it may be necessary to sand mill the grind paste, which is more costly and time consuming than the present methods.

The alcohol component of the present additive can be introduced to the aqueous compositions through the film-forming resin itself if an alcohol comprises part of the solvent in which the resin is contained. Alternatively, the alcohol can be added separately at any point during formulation.

The present invention is therefore also directed to a method for preparing a pigmented, aqueous coating composition comprising grinding the pigment with a "carboxylic acid component" comprising a carboxylic acid and an amine and mixing the ground pigment into a "resin component" comprising a film-forming resin; either the carboxylic acid component or the resin component will further comprise an alcohol. Standard methods for grinding pigment can be employed. The ground pigment can then be mixed in the film-forming resin by any means known in the art; a particularly suitable method employs a cowles-type mixer. Other suitable mixers include sand mills and horizontal mills.

The present invention is further directed to a method for preparing a pigmented, aqueous coating composition comprising adding to a pigmented, film-forming resin, a composition comprising a carboxylic acid and an amine, wherein either the resin component or the carboxylic acid component further comprise an alcohol.

The present invention is further directed to a method for inhibiting corrosion on a metal food can comprising applying to the inside of the can any of the coating compositions described above. The coating can be applied by any method conventional in the art, such as high pressure airless spray, rollercoat, or coil coat. Particularly suitable is a high pressure airless spray. The coating can be applied so as to yield the desired dry film thickness ("DFT"). A DFT of between about 5 and 7 microns is typically suitable.

As noted above, any metal substrate can be used for the food cans treated according to the present invention. The food cans can be either two-piece or three-piece cans. A "two-piece can" will be understood by those skilled in the art as referring to a drawn and wall ironed can ("DWI"). A "three-piece" food can will be understood by those skilled in the art as referring to one that is coated in flat sheet, fabricated and welded. Normally, the two-piece can is coated after fabrication and the three-piece can is fabricated after coating.

The methods of the present invention, employing the compositions described above, result in excellent wetting on the interior surface of the can. In the preparation of DWI food cans, a coating is often applied to the outside of the can that splashes inside the can; this coating is called a wash coat, and it generally contains a considerable amount of wax. Significantly, the present compositions even wet over the wash coat that has gotten on the inside of the food can.

The ability of a coating to cover or "wet" the inside of a food can is generally measured using an enamel rater test. This test generally involves pouring salt water into the can and running a current through the water; if the can is completely coated, there should be an enamel rater reading of zero milliamps. Readings of up to about 25 milliamps are usually tolerated. The coatings of the present invention can consistently give enamel rater readings of less than 25, such as less than 4 or even less than 1.

In addition to the excellent wetting properties of the present coatings, the coatings also have the added advantage of being environmentally desirable. More specifically, the coatings have a low VOC as determined by the VOC minus water calculation. The VOC of the present coatings is typically less than or equal to about 3.2 pounds of solvent per gallon minus water. VOC values from 3.0 to 3.2 can be consistently achieved, with VOC values as low as 2.7 or even 2.4 also being attainable according to the present invention.

As used herein, unless otherwise expressly specified, all numbers such as those expressing values, ranges, amounts or percentages may be read as if prefaced by the word "about", even if the term does not expressly appear. Also, any numerical range recited herein is intended to include all sub-ranges subsumed therein. As used herein, the term "polymer" refers to oligomers and both homopolymers and copolymers, and the prefix "poly" refers to two or more.

EXAMPLES

The following examples are intended to illustrate the invention, and should not be construed as limiting the invention in any way.

Example 1

Samples 1–5, all of which were low VOC aqueous white interior airless sprays, were prepared generally as follows, using the ingredients and amounts (in pounds) shown in Table 1. The epoxy-acrylic dispersion (65 percent solids in solvent and let down in water to about 24 percent solids) was loaded into a cowles tank. The mixer was turned on and the dimethylethanolamine, SURFONYL 104, and oleic acid (Samples 1, 2, 3, 5) or 50/50 capric acid/butyl cellosolve (Sample 4) were added sequentially. Then the caprylic acid (Samples 1, 4, 5), capric acid/butyl cellosolve (Sample 2) or caproic acid (Sample 3) was added; upon addition of this component the viscosity of the mixture dropped significantly and a vortex formed, which allowed excellent agitation and pigment dispersion. Titanium dioxide was then added. The paste was mixed on high speed for about 1 hour to a fineness of grind ("F.O.G.") of less than 7. After the proper pigment dispersion was achieved, the melamine and deionized water were added. The above cowles dispersion was then pumped into a thin down tank, which contained more of the epoxy acrylic dispersion, melamine, pentanol (Samples 1–4) or 2-ethylhexanol (Sample 5), carnauba emulsion, oleic acid (Samples 1–3 and 5) or capric acid/butyl cellosolve (Sample 4) and water.

The VOC of the coatings was about 2.5 lbs/gal minus water. The coatings can be sprayed under high pressure airless conditions to give a uniform film with excellent wetting over tin plated steel, low enamel raters, and good performance in vegetable food packs.

TABLE 1

| Component | 1 | 2 | 3 | 4 | 5 |
|---|---|---|---|---|---|
| Epoxy acrylic dispersion[1] | 9.21 | 8.17 | 8.46 | 8.67 | 8.69 |
| Dimethylethanol amine | 0.16 | 0.14 | 0.15 | 0.15 | 0.15 |
| Surfactant[2] | 0.42 | 0.37 | 0.38 | 0.40 | 0.39 |
| Oleic acid[3] | 0.16 | 0.13 | 0.14 | — | 0.15 |
| Caprylic acid[4] | 0.19 | — | — | 0.18 | 0.18 |
| Capric acid/butyl cellosolve[5] | — | 0.35 | — | 0.29 | — |
| Caproic acid[6] | — | — | 0.17 | — | — |
| Titanium dioxide | 13.38 | 11.86 | 13.97 | 12.59 | 12.62 |
| Melamine[7] | 1.16 | 1.01 | 1.06 | 1.09 | 1.09 |
| Deionized water | 4.48 | 4.49 | 5.60 | 5.97 | 5.97 |
| Epoxy acrylic dispersion | 47.32 | 41.94 | 43.43 | 44.5 | 44.59 |
| Melamine | 5.83 | 5.17 | 5.35 | 5.49 | 5.50 |

TABLE 1-continued

| Component | 1 | 2 | 3 | 4 | 5 |
|---|---|---|---|---|---|
| Pentanol | 1.21 | 1.07 | 1.11 | 0.99 | — |
| 2-ethyl hexanol | — | — | — | — | 0.99 |
| Carnauba emulsion[8] | 0.19 | 0.18 | 0.19 | 0.19 | 0.19 |
| Oleic acid | 0.03 | 0.03 | 0.03 | — | 0.03 |
| Caprylic acid/butyl cellosolve | — | — | — | 0.06 | — |
| Water | 16.26 | 25.09 | 19.96 | 19.43 | 19.46 |
| Solids content[9] (%) | 32.24 | 27.23 | 30.70 | 29.09 | 29.09 |
| Viscosity (seconds)[10] | 49 | 28 | 28 | 26 | 26 |
| VOC[11] (lb/gallon) | 2.5 | 2.7 | 2.7 | 2.6 | 2.7 |

[1]The dispersion can be made by dissolving epoxy resin in solvent and then reacting the oxirane with the carboxyls on a preformed acrylic using an amine as a catalyst or by dissolving epoxy resin in solvent and then polymerizing acrylic monomers in the presence of the epoxy, which allows the epoxy to be dispersed in water once the acrylic is neutralized with an amine.
[2]2,4,7,9-tetramethyl-5-decyne-4,7-diol obtained from Air Products as SUR-FYNOL 104.
[3]Food grade, kosher, obtained from Acme Hardesty Co.
[4]Obtained from Acme Hardesty Co.
[5]50/50 capric acid butyl cellosolve obtained from Acme Hardesty Co.
[6]Obtained from Acme Hardesty Co.
[7]Obtained from Cytec Industries, Inc. as CYMEL 301.
[8]Obtained from Carroll Scientific.
[9]Determined by ASTM 1 hour at 230° F.
[10]Determined using a #4 Ford Cup at 77° F.
[11]"Determined running ASTM solids and water and using the VOC calculation minus water.

Example 2

Samples 1, 2 and 4, prepared according to Example 1, were coated to a dry film weight of 300 to 350 mg on 300×407 cans. The cans were tinplate two-piece cans and the coating was applied by high pressure airless spray. The coated cans were subjected to an enamel rater test. The test was run using a WACO tester from Wilkens-Anderson Co. of Chicago, Ill., following the manufacturer's instructions. The solution poured into the can, i.e. the electrolyte, was 1% NaCl and 1% NH$_4$SCN. Results are shown in Table 2. As can be seen in the table, all results were well below 25 and averaged less than 1.3 for Sample 1, less than 1.0 for Sample 2 and 0.7 for Sample 4. This indicates that excellent coverage is achieved with the present compositions.

TABLE 2

| SAMPLE | ENAMEL RATER in a 300 × 407 can |
|---|---|
| 1 | 0; 0; 0; 0.3; 1.3; 4.1; 0.1; 6.5; 3.5; 0.1; 0; 0.5; 0.9; 0; 1.7 |
| 2 | 0.1; 0.5; 0.8; 1.6; 1.0; 1.4; 0.6; 1.3 |
| 4 | 0.4; 0; 0; 0; 0.4; 0.1; 4.0 |

Example 3

Cans prepared as described in Example 2 using Sample 1 were subjected to pack testing in which cans were hot filled with food at 170° F. and then steam processed for 1.5 hours at 250° F. Results for two different cans are presented in Tables 3 and 4. As can be seen in the tables, the paint made in Example 1 is comparable to or better than a commercial control (643E503, commercially available from ICI) with regard to both head space adhesion and head space corrosion on a two-piece can in cream style corn, chicken noodle soup, and pasta. Adhesion was determined by removing the lid from the can and cutting the can lengthwise. 610 tape from 3M was pressed firmly to the top of the can head space (starting from the top and extending down about ¾ inches). The tape was then removed in one quick motion and the can visually inspected for remaining coating. A "ten" indicates no coating was removed. Corrosion was determined by visual inspection as well; areas in which the tape pulled coating off are generally regarded as being corroded.

TABLE 3

| Paint | Pack media | 120° F. storage | Adhesion in headspace* | Corrosion in Headspace* |
|---|---|---|---|---|
| Sample 1 | Cream corn | 7 days | 4,4 | 4,4 |
| ICI white 643E503 | Cream corn | 7 days | 4,6 | 4,6 |
| Sample 1 | Chicken noodle | 7 days | 4,6 | 4,6 |
| ICI white 643E503 | Chicken noodle | 7 days | 2,3 | 2,3 |
| Sample 1 | pasta | 7 days | 10,10 | 10,10 |
| ICI white 643E503 | pasta | 7 days | 10,10 | 10,10 |

*Note: rating scale is based on the following: 10 = excellent, no loss 0 = total loss

TABLE 4

| Paint | Pack media | 120° F. storage | Adhesion in headspace* | Corrosion in Headspace* |
|---|---|---|---|---|
| Sample 1 | Cream corn | 17 days | 2,3 | 2,3 |
| ICI white 643E503 | Cream corn | 17 days | 2,4 | 4,6 |
| Sample 1 | Chicken noodle | 17 days | 4,4 | 4,4 |
| ICI white 643E503 | Chicken noodle | 17 days | 2,2 | 2,2 |
| Sample 1 | pasta | 17 days | 10,10 | 10,10 |
| ICI white 643E503 | pasta | 17 days | 10,10 | 10,10 |

*Note: rating scale is based on the following: 10 = excellent, no loss 0 = total loss Example 4

A gold-colored can coating according to the present invention was prepared by dissolving epoxy in butanol and butyl cellosolve and polymerizing the acrylic monomers in the presence of the epoxy. Dimethylethanolamine was then added to the batch. The batch was then added to a thin down tank containing water and cooled from about 180° F. to about 150° F. The oleic acid, caprylic acid and phenolic were then sequentially added. The batch was held for one hour at a temperature between 140° F. and 150° F., after which time the SURFYNOL 104 was added. The batch was then cooled to below 110° F. and the wax, a carnauba emulsion, was added. Viscosity was adjusted with water using a No. 4 Ford cup to the desired viscosity range. The solids content of the final product was determined to be 28 percent (according to ASTM D2360 at 230° F. for one hour) and 25 percent (according to a similar procedure but at 400° F. for five minutes). The viscosity of the product was between 22 and 30 seconds as determined using a No. 4 Ford cup. The coating was applied to a 300×407 can in an amount of 250 mg and was baked in a commercial four zone inside bake oven with the first zone being at 211° F., the second at 457° F., the third at 438° F. and the fourth at 438° F. for a total of five to six minutes bake time. The coating did not blister.

TABLE 5

| Component | Amount in weight percent, based on total composition weight |
|---|---|
| Epoxy acrylic resin solids | 13.50 |
| Butanol | 3.5 |
| Butyl cellosolve | 1.79 |
| Dimethylmethanolamine | 1.35 |
| Water | 60.53 |
| Oleic acid | 0.22 |
| Caprylic acid | 0.22 |
| Phenolic[12] | 18.40 |
| SURFYNOL 104 | 0.49 |

[12]Bisphenol A - resole, commercially available from Schenectady International as HRJ 12632.

Whereas particular embodiments of this invention have been described above for purposes of illustration, it will be evident to those skilled in the art that numerous variations of the details of the present invention may be made without departing from the invention as defined in the appended claims.

Therefore, it is claimed:

1. An additive comprising:
    a) a carboxylic acid;
    b) an amine; and
    c) an alcohol;
wherein the molar ratio of a:b:c is 1.5–3.5:11.0–14.5:43–92.

2. The additive of claim 1, wherein the carboxylic acid has from 2 to 18 carbon atoms.

3. The additive of claim 2, wherein the carboxylic acid has from 8 to 18 carbon atoms.

4. The additive of claim 3, wherein the carboxylic acid is oleic acid, caprylic acid, or mixtures thereof.

5. The additive of claim 1, wherein the amine is dimethylethanolamine.

6. The additive of claim 1, wherein the alcohol has at least 4 carbons.

7. The additive of claim 6, wherein the alcohol has from 4 to 7 carbons.

8. The additive of claim 6, wherein the alcohol is pentanol.

9. An aqueous coating composition comprising:
    a) a film-forming resin;
    b) an effective amount of carboxylic acid;
    c) an amine; and
    d) an alcohol, wherein the molar ratio of b:c:d is 1.5–3.5:11.0–14.5:43–92.

10. An aqueous coating composition comprising:
    a) an epoxy acrylic resin;
    b) an effective amount of carboxylic acid;
    c) an amine; and
    d) an alcohol.

11. The composition of claim 9, wherein the carboxylic acid has from 8 to 18 carbon atoms.

12. An aqueous coating composition comprising:
    a) a film-forming resin;
    b) an effective amount of carboxylic acid;
    c) dimethylethanolamine; and
    d) an alcohol.

13. The composition of claim 9, wherein the alcohol has from 4 to 7 carbons.

14. The composition of claim 9, further comprising a pigment.

15. An aqueous coating composition comprising:
    a) a film-forming resin;
    b) an effective amount of carboxylic acid;
    c) an amine;
    d) an alcohol; and
    e) titanium dioxide.

16. A method for inhibiting corrosion on a metal food can comprising applying to the inside of said can an aqueous coating composition comprising:
    a) a film-forming resin;
    b) an effective amount of carboxylic acid;
    c) an amine; and
    d) an alcohol.

17. The method of claim 16, wherein the food can is a two-piece food can.

18. The method of claim 16, wherein the food can is a three-piece food can.

19. A method for preparing a pigmented, aqueous coating composition comprising:
    a) grinding the pigment with a carboxylic acid component comprising a carboxylic acid and an amine; and
    b) mixing the ground pigment of step a) into a resin component comprising a film-forming resin; and wherein either the carboxylic acid component or the resin component further comprise alcohol.

20. The method of claim 19, wherein the carboxylic acid component further comprises the alcohol.

21. The method of claim 19, wherein the film forming component further comprises the alcohol.

22. A method for preparing a pigmented, aqueous coating composition comprising adding to a composition comprising a pigmented, film-forming resin, an additive comprising an effective amount of carboxylic acid and an amine, wherein either the film-forming resin or the additive further comprise alcohol; and wherein the molar ratio of carboxylic acid:amino:alcohol is 1.5–3.5:11.0–14.5:43–92.

23. A method for preparing a pigmented, aqueous coating composition comprising adding to a composition comprising a pigmented film-forming resin comprising an epoxy acrylic resin, an additive comprising an effective amount of carboxylic acid and an amine, wherein either the film-forming resin or the additive further comprises alcohol.

24. A food can coating composition having a solids content of 26 weight percent or greater comprising caprylic acid and a film-forming resin, wherein solids content is determined by ASTM D2360 at 230° F. for one hour.

25. The coating composition of claim 24, wherein the solids content is 28.

26. The coating composition of claim 24, wherein the resin is an epoxy acrylic resin.

27. The coating composition of claim 26, further comprising oleic acid.

28. The coating composition of claim 27, wherein the molar ratio of oleic acid to caprylic acid is 1.0–2.5:1.0–7.5.

29. A food can coated and baked with 250 mg of the coating of claim 24, wherein the coated food can is substantially free of blistering.

30. A method for increasing the solids content of a coating formulation comprising adding caprylic acid to the formulation.

31. The coating composition of claim 9, further comprising a crosslinker.

32. The composition of claim 31, wherein the crosslinker is melamine.

33. The composition of claim 31, wherein the crosslinker is phenolic.

* * * * *